United States Patent [19]

Such

[11] Patent Number: 4,666,525

[45] Date of Patent: May 19, 1987

[54] COATING COMPOSITIONS

[75] Inventor: Christopher H. Such, Melbourne, Australia

[73] Assignee: Dulux Australia Ltd., Victoria, Australia

[21] Appl. No.: 719,133

[22] Filed: Apr. 2, 1985

[30] Foreign Application Priority Data

Apr. 6, 1984 [AU] Australia .............................. PG4463
May 29, 1984 [AU] Australia .............................. PG5254

[51] Int. Cl.$^4$ .............................................. C04B 14/34
[52] U.S. Cl. ................................ 106/308 Q; 106/290; 106/308 M
[58] Field of Search .............. 106/290, 308 M, 308 Q, 106/1.18, 1.05; 524/107, 439, 539, 548

[56] References Cited

U.S. PATENT DOCUMENTS

| | | | |
|---|---|---|---|
| 4,403,003 | 9/1983 | Backhouse | 427/408 |
| 4,410,667 | 10/1983 | Porter, Jr. et al. | 525/440 |
| 4,410,668 | 10/1983 | Piccirilli et al. | 525/440 |
| 4,451,597 | 5/1984 | Victorius | 524/40 |
| 4,499,151 | 2/1985 | Dowbenko et al. | 428/447 |
| 4,526,910 | 7/1987 | Das et al. | 524/376 |
| 4,528,344 | 7/1985 | Chang | 525/509 |

*Primary Examiner*—Amelia B. Yarbrough
*Attorney, Agent, or Firm*—Cushman, Darby & Cushman

[57] ABSTRACT

This invention relates to coating compositions which comprise metal flake pigments.

The disadvantages of known "metallic" finishes, e.g. haziness and mottle, can be overcome by the inclusion at the pigment dispersion stage of a chemical compound which comprises at least one hydroxyl group and at least one group of the formula

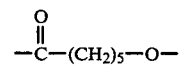

Coating compositions thus prepared are useful in the automotive and refinish industries.

5 Claims, No Drawings

COATING COMPOSITIONS

This invention relates to coating compositions and more particularly to solvent-based coating compositions which comprise metallic flake pigments.

The demand for so-called "metallic" finishes has increased constantly ever since such finishes were first introduced, this being particularly true of the automotive industry where their attractive appearance is much valued. The "metallic" effect is brought about by the inclusion in the coating composition of pigments which are minute flakes or plates of metal (usually aluminium).

Metallic flake pigments are generally incorporated into coating compositions by first dispersing the pigment in solvent alone, and then blending this dispersion with the film-forming medium and the other ingredients. I have now found that the addition to metallic finish coating compositions of certain chemical compounds makes possible the achievement of a "metallic" finish whose appearance is substantially better than that of known compositions. I therefore provide, according to the present invention a solvent-based coating composition which comprises metallic flake pigment wherein the metallic flake pigment is initially dispersed in solvent in the presence of a chemical compound which comprises at least one hydroxyl group and at least one group of the formula

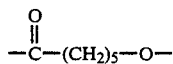

The chemical compound comprising at least one hydroxyl group and at least one group of the abovementioned formula may be derived, for example, from the compound ε-caprolactone.

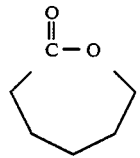

This ring will readily open in the presence of certain chemical species, for example, an active hydrogen atom, to give a linear hydrocarbon structure with an ester group. Other units of the abovementioned formula can readily be added on to form a long chain of the general formula

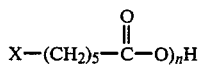

where X is the radical of a chemical compound comprising the chemical species which opened the ε-caprolactone ring. The number n can in theory be infinite, but there is a practical limit to the size of the molecule, this being dictated by its compatibility with the coating composition.

This type of linear molecule is not the only type of chemical compound which can be used. For example, a polymer or pre-polymer comprising suitable chemical species may be used as the basis of a suitable chemical compound. The chemical species can act as reactive sites for a molecule such as ε-caprolactone and the result is a chemical compound having a polymer/pre-polymer "backbone" and a number of side chains made up of groups of the abovementioned formula.

Although chemical compounds having at least one group of the abovementioned formula will work in my invention, I have found that for best results, there should be sufficient groups present such that the compounds are waxy solids. In practice, this means that there should be a minimum of about 5 groups present.

A typical example of a suitable chemical compound for use in my invention is pentaerythritol which has been reacted with ε-caprolactone to give a compound with 80 groups of the abovementioned formula. It is of course permissible to blend two or more chemical compounds.

The quantity of chemical compound to be used in the coating compositions can vary enormously, depending on the nature of the composition and the quantity and type of metallic flake pigment to be used. I believe, without restricting the scope of my invention in any way, that there must be sufficient present to coat completely the surface of the pigment particles. It is thus impossible to put precise limits of the quantity, but in general terms, most coating compositions will have between 5 and 30% by weight of the weight of the pigment.

The use of the compound ε-caprolactone is an especially convenient way of preparing chemical compounds for use in my invention but it is by no means the only way of doing so, and suitable compounds prepared by alternative synthetic routes will work in my invention.

This invention is applicable to any of the solvent-based film-forming coating systems known to the art, for example, acrylic lacquers and acrylic, alkyd, polyester and polyurethane enamels. It may also be used to advantage in the so-called "basecoat/clearcoat" finishes, to enhance their already excellent appearance.

The invention is further illustrated by the following examples in which all parts are expressed by weight.

EXAMPLE 1

Preparation of a thermoplastic "metallic" coating composition according to the invention and comparison with a conventional material.

Aluminium flake pigment was dispersed in toluene and a dispersant in the following proportions;

| | |
|---|---|
| aluminium flake pigment | 1.11 parts |
| dispersant | 0.20 parts |
| toluene | 2.04 parts |

(The dispersant was prepared by heating 1 mol of oleic acid, 40 mol of ε-caprolactone and 0.2 mol dibutyl tin dilaurate for 2 hours at 170° C. It was a waxy solid at room temperature).

The abovementioned dispersion was blended with an acrylic copolymer, cellulose acetate butyrate (CAB) and butyl benzyl phthalate to give a coating composition whose non-volatile content was as follows:

| | | |
|---|---|---|
| aluminium flake pigment | 1.10 | Parts |
| dispersant | 0.20 | Parts |
| 94/6 methyl methacrylate/butylacrylate copolymer | 44.27 | Parts |
| CAB (EAB 381-2 ex Eastman Chemicals) | 27.21 | Parts |
| CAB (EAB 381-20 ex Eastman | 3.89 | Parts |

-continued

| Chemicals) | |
|---|---|
| butyl benzyl phthalate | 23.33 Parts |

The coating composition thus prepared was thinned to spraying viscosity and applied to phosphated and primed steel panels. A commercially-available silver metallic acrylic lacquer having a film-forming medium comprising a methyl methacrylate copolymer, CAB and butyl benzyl and butyl cyclohexyl phthalate plasticisers was also sprayed on to identical panels. Both sets of panels were baked for 10 minutes at 80° C., lightly sanded and then reflow baked for 30 minutes at 135° C. to give smooth glossy films.

The low angle (20°) gloss of both compositions were tested and they were also assessed for the surface "haze" characteristic of known single layer "metallic" finishes. The composition according to the invention had a 20° gloss of 80% with complete freedom from the "haze", whereas the commercial composition had a 20° gloss of 67% with considerable "haze".

EXAMPLE 2

Preparation of a series of chemical compounds.

The chemical compounds prepared were the reaction products of (a) 1 mol pentaerythritol with 80 mols $\epsilon$-caprolactone monomer;

(b) 1 mol dibutylamine with 30 mols $\epsilon$-caprolactone monomer; and (c) 1 mol oleic alcohol with 30 mols $\epsilon$-caprolactone monomer The preparations were identical and were carried out using the method described below.

The reactants were charged to a reaction vessel and 0.5% by weight of dibutyl tin dilaurate catalyst was added. The mixture was heated to 170° C. maximum and held there until reaction was complete (measured by solids content and free $\epsilon$-caprolactone content).

All three chemical compounds were low melting point waxy solids which were readily soluble in common organic solvents.

EXAMPLE 3

Preparation of coating compositions using the chemical compounds of Example 2.

The three chemical compounds prepared according to Example 2 were each used as dispersants for aluminium flake pigment according to the following formula:

| aluminium flake pigment | 0.98 parts |
|---|---|
| chemical compound | 0.15 parts |
| toluene | 1.0 parts |

These ingredients were mixed and stirred slowly to achieve dispersion of the aluminium pigment. This dispersion was utilised in the preparation of a coating composition whose non-volatile content was identical to that of Example 1.

The three coating compositions thus prepared were thinned to spraying viscosity and applied to phosphated and primed steel panels. A commercially-available silver metallic acrylic lacquer having as film-forming medium methyl methacrylate copolymer, cellulose acetate butyrate and plasticisers was applied to identical panels. All panels were baked for 10 minutes at 80° C., lightly sanded and then reflow baked at 135° C. for 30 minutes to give smooth, glossy films.

The 20° gloss of the panels was measured and they were assessed visually for freedom from "spray mottle". The degree of "mottle" (the presence of irregularly shaped and randomly distributed areas of non-uniform colour) is a measure of the control of the aluminium particles during spraying. In this case, it was rated on a subjective numerical scale of 1–10, where 10 represents complete freedom from mottle and 1 represents extremely bad mottle.

| | 20° gloss | mottle rating |
|---|---|---|
| commercial composition | 68 | 5 |
| composition with chemical | | |
| compound (a) | 77 | 9 |
| compound (b) | 78 | 8 |
| compound (c) | 77 | 9 |

The compositions according to the invention thus showed significantly higher gloss and freedom from mottle than the commercial coating composition.

EXAMPLE 4

Use of chemical compounds according to the invention in a basecoat/clearcoat finish.

Three chemical compounds were prepared according to the method of Example 2. These were the reaction products of (a) 1 mol pentaerythritol with 80 mols $\epsilon$-caprolactone monomer;

(b) 1 mol trimethylol propane with 60 mols $\epsilon$-caprolactone monomer; and (c) 1 mol ethylene glycol with 40 mols $\epsilon$-caprolactone monomer.

These were each used to prepare dispersions of aluminium flake pigment by blending the following materials;

| aluminium flake pigment | 1.7 parts |
|---|---|
| chemical compound | 0.6 parts |
| toluene | 2.0 parts |

A standard aluminium pigment dispersion was prepared by repeating the above-described preparation without the chemical compound.

The dispersions were each processed into thermoplastic coating compositions suitable as the basecoat of a basecoat/clearcoat composition by blending the following film-forming components;

| acrylic copolymer | 16.5 parts |
|---|---|
| cellulose acetate butyrate | 6.4 parts |
| plasticiser | 7.3 parts |

The four compositions were thinned identically and applied to primed phosphated steel panels. When the panels were touch dry, they were coated with a commercially-available thermoplastic acrylic clearcoat and the finish air dried.

The panels were assessed subjectively for mottle control and gloss, assessment being made on a scale of from 1 (very bad) to 10 (excellent). The results were as follows:

|  | Gloss | Mottle |
| --- | --- | --- |
| standard Al dispersion | 6 | 6 |
| dispersion with compound (a) | 8 | 8 |
| dispersion with compound (b) | 8 | 8 |
| dispersion with compound (c) | 9 | 9 |

The coating compositions comprising chemical compounds according to the invention have superior properties even when coated with a conventional clearcoat.

I claim:

1. A solvent-based coating composition comprising metallic flake pigment, made by a process wherein the metallic flake pigment is first incorporated into a dispersion consisting essentially of the metallic flake pigment, solvent and a chemical compound which comprises at least one hydroxy group and at least one group of the formula

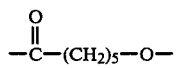

prior to blending with other constituents to form the coating composition.

2. A solvent-based coating composition according to claim 1, where the group is derived from ε-caprolactone.

3. A solvent-based coating composition according to claim 1 wherein the chemical compound comprises at least 5 groups of the formula.

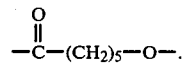

4. A solvent-based coating composition according to claim 1, wherein the quantity of chemical compound present in the composition is from 5–30% by weight of the metallic flake pigment.

5. A solvent-based coating composition comprising metallic flake pigment, made by a process wherein the metallic flake pigment is first incorporated into a dispersion consisting essentially of the metallic flake pigment, solvent and a chemical compound which has the formula

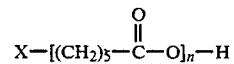

prior to blending with other constituents to form the coating composition, wherein X is the radical of a chemical compound which has been reacted with ε-caprolactone to form said compound and n is an integer.

* * * * *